US009460721B2

(12) United States Patent
Ouakil et al.

(10) Patent No.: US 9,460,721 B2
(45) Date of Patent: Oct. 4, 2016

(54) METHOD FOR CONTEXT DRIVEN SPEECH RECOGNITION AND PROCESSING

(71) Applicants: Lisa Ouakil, Oviedo, FL (US); Abdelhamid Ouakil, Orlando, FL (US); Ouns Mouri, San Diego, CA (US); Peter Smith, Orlando, FL (US)

(72) Inventors: Lisa Ouakil, Oviedo, FL (US); Abdelhamid Ouakil, Orlando, FL (US); Ouns Mouri, San Diego, CA (US); Peter Smith, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/598,958

(22) Filed: Jan. 16, 2015

(65) Prior Publication Data
US 2016/0210968 A1    Jul. 21, 2016

(51) Int. Cl.
*G06F 17/27*   (2006.01)
*G06F 17/20*   (2006.01)
*G10L 15/28*   (2013.01)
*G10L 15/065*  (2013.01)

(52) U.S. Cl.
CPC ............. *G10L 15/28* (2013.01); *G06F 17/274* (2013.01); *G06F 17/2765* (2013.01); *G10L 15/065* (2013.01)

(58) Field of Classification Search
None
See application file for complete search history.

(56) References Cited

U.S. PATENT DOCUMENTS

| | | | |
|---|---|---|---|
| 5,524,169 A * | 6/1996 | Cohen .................... | G10L 15/26 704/231 |
| 6,567,778 B1 * | 5/2003 | Chao Chang ......... | G06F 17/278 704/257 |
| 8,311,823 B2 * | 11/2012 | Bloebaum ......... | G06F 17/30746 704/231 |
| 8,645,138 B1 * | 2/2014 | Weinstein ............. | G10L 15/19 704/231 |
| 8,670,987 B2 * | 3/2014 | Bergl ......................... | 704/270 |
| 2006/0074656 A1 * | 4/2006 | Mathias ................ | G10L 15/063 704/243 |
| 2008/0235022 A1 * | 9/2008 | Bergl ......................... | 704/257 |
| 2014/0379349 A1 * | 12/2014 | Bangalore ......... | G06F 17/30637 704/257 |

* cited by examiner

*Primary Examiner* — Marcus T Riley
(74) *Attorney, Agent, or Firm* — Mark O. Glut; NAWCAD

(57) ABSTRACT

The invention is system and method to recognize speech vocalizations using context-specific grammars and vocabularies. The system and method allow increased accuracy of recognized utterances by eliminating all language encodings irrelevant to the current context and allowing identification of appropriate context transitions. The system and method creates a context dependent speech recognition system with multiple supported contexts, each with specific grammar and vocabulary, and each identifying the potential context transition allowed. The system and method also include programmatic integration between the context dependent speech recognition system and other systems to make use of the recognized speech.

9 Claims, 2 Drawing Sheets

METHOD FOR CONTEXT DRIVEN SPEECH RECOGNITION AND PROCESSING

STATEMENT OF GOVERNMENT INTEREST

The invention described herein may be manufactured and used by or for the Government of the United States of America for governmental purposes without payment of any royalties thereon or therefor.

BACKGROUND

Historically, speech recognition technologies have been integrated into training systems and similar technologies using very large, rigid speech models due to the lack of a software layer necessary to incorporate speech into the training system more effectively.

In conventional speech recognition technologies, implemented in training systems, the recognition software application, which is the part of the trainer core that consumes the recognized result, interprets the recognized text to take appropriate actions based on what the speaker says. This conventional approach requires the application to have intimate knowledge of vocabulary definitions. This requirement pushes the consuming application into an unbounded cycle.

In essence, an entire grammar including all possible words, numbers, phrases, etc. of a particular system are loaded into the compiled software application of a speech recognizer. For example, for a system designed to assist in the training of pilots, all the possible commands, orders, and responses (i.e. aircraft vectors, heading coordinates, etc.) that are used are loaded into compiled software. Then, when a speech pattern is received by the recognition system, it is compared to all of the possible grammar options that have been loaded into the system.

Many training systems, because of their specific environment, have to incorporate very large phraseologies (in essence a new vocabulary), which places a significant processing burden on the software and hardware of training system. This burden is even greater with more complex training systems such as those used by the military. Military training systems have a unique vocabulary, including many acronyms that are specific to organizations, exercises, times and places being simulated. Consequently, handling these large, unique vocabularies in simulations presents a huge challenge to speech recognition engines.

Therefore, there is a need for a recognition system that minimizes the size of the grammar and vocabulary required to be processed by the training software. This invention uses the framework of context driven speech recognition to minimize the size of the grammar loaded at any point in the system when it is executing a recognition task against an audio stream.

SUMMARY

The present invention is a novel system and method for computer speech recognition and processing driven by the context of the speech. This invention allows minimization of the grammar loaded into the speech recognition system. The grammar is managed outside of the compiled software. The vocabulary is managed with a software layer handling the interaction between the application framework and the grammar model written in a Grammar Extensible Mark-Up Language (GrXML). Then, the software loads appropriate grammar based on the state of the programs and sends recognition results out to a user interface as consumable data.

The application framework is compiled software written in C+ or the like. The application framework provides the means to handle vocabulary that is logically divided into subsections according to the state of the training exercise so that the recognizer is relieved of handling the complexity of an entire phraseology associated with the particular training system. A set of functions are embedded in the grammar definition so the grammar module can communicate context management to the application framework. This principle decouples the specific speech recognition needs of the system from the application framework. Therefore, this system can work with any application that uses a speech recognizer to process a large vocabulary.

With this method, a first set of grammar rules is created using a prior knowledge of the type of vocabulary used in the training system exercise. These grammar rules are loaded into a speech recognizer. Then a first transmitted audio stream is received by the system. The speech recognizer runs a language script to compare the language in the first transmitted audio stream to language in the first set of grammar rules to determine whether there is a match. If a match is found, a textual representation of the language of the first transmitted audio stream is produced using language of one of the first set of grammar rules. This process is used to create consumable data (coherent language), which is transmitted to a processor in the training system core.

When there are multiple matches found between the first transmitted audio stream and the first set of grammar rules, the system determines which grammar rule has language that most likely matches the language of the first transmitted audio stream. When a match is made, a textual representation of the language of the first transmitted audio stream is produced and consumable data is created and transmitted to the processor.

If no match is found between the language of the first transmitted audio stream and the language of the first set of grammar rules, a subsequent set of grammar rules is created and the matching process is repeated. Once a match is found, a textual representation of the language is created and used to create consumable data that is transmitted to the processor.

Once the first transmitted audio stream is matched and consumable data created, that data is used to create a separate set of grammar rules to recognize and process a second transmitted audio stream. That is, the next set of grammar rules are defined by the previous set of consumable data along with the state of simulation within the training system. Therefore, the grammar rules will contain language that has a high probability of being used in the next transmitted audio stream. These steps are repeated as long as new audio transmissions are received.

With this approach, the management of the grammar occurs outside of the compiled software. Context definition and management play a central role and are authored in tandem. The speech framework of this invention relieves the consuming application from any vocabulary knowledge by providing the means to encapsulate, in the recognition result, any action the consuming application needs to take based on what is recognized. In addition to encapsulating the context management within the recognition result, all required actions and behaviors can also be embedded for the consuming application to create a loose coupling with the speech recognition.

DRAWINGS

DESCRIPTION

In the following description of the present invention, reference will be made to various embodiments which are not meant to be all inclusive. The current invention can be implemented using various forms of software and hardware.

Figure 1:
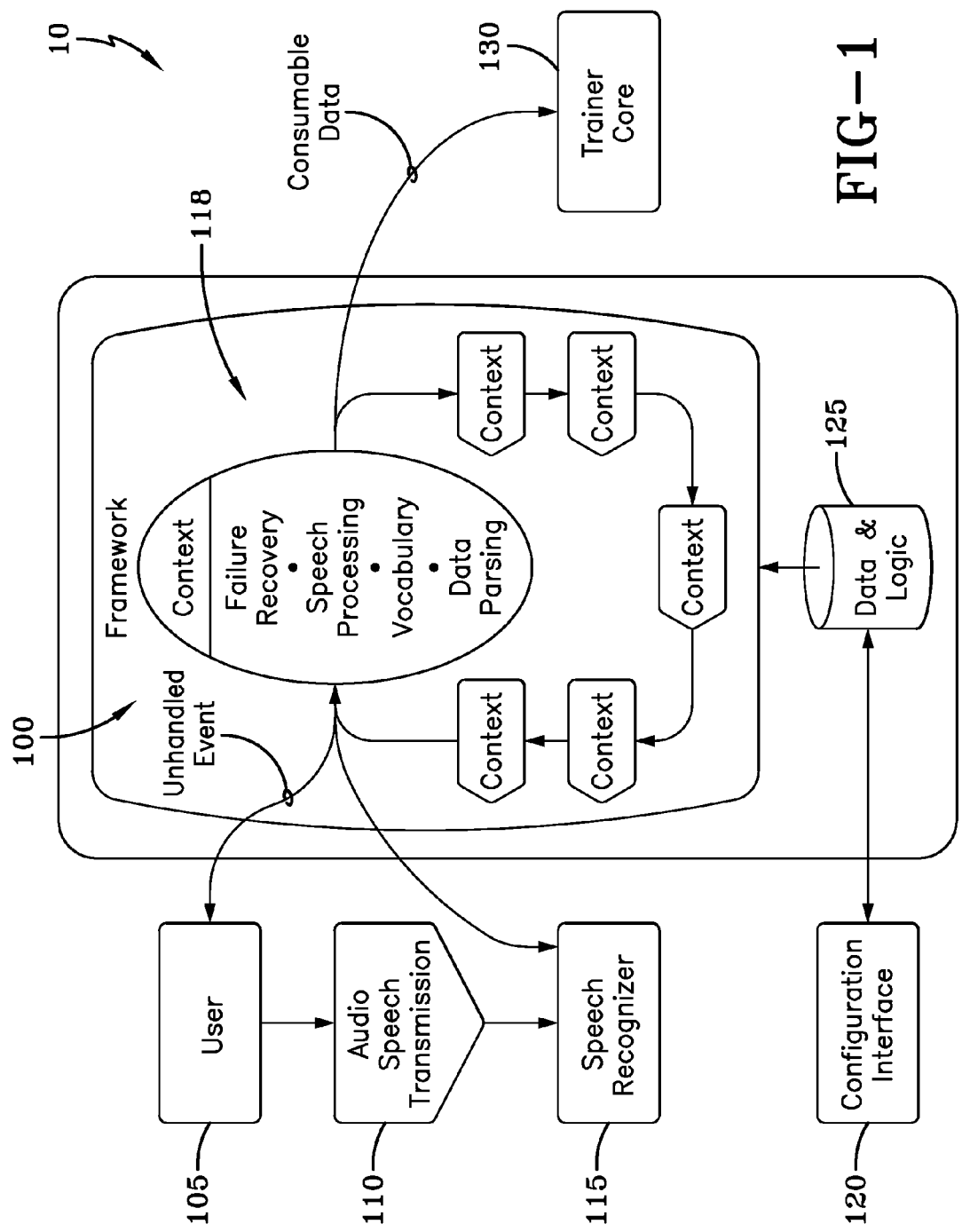
FIG. 1 is a diagram showing the elements of the speech recognition system.

Preferred embodiments of the present invention are illustrated by way of example below and in FIGS. 1 and 2. FIG. 1 shows different elements of the speech processing and recognition system 10, which comprises an application framework 100 in which the audio speech transmissions are processed and transformed into consumable data. The recognition system 10 also comprises various elements outside of the application framework 100 where the audio speech transmissions are recognized and configured, and the grammar and grammar logic 125 is stored.

Referring to FIG. 1, the user 105 inputs an audio speech transmission 110 that is transmitted to a speech recognizer 115. Speech recognition policies are loaded on the speech recognizer 115 and work with the software 118 within the application framework 100 to process the audio speech transmission 110. The audio speech transmission process comprises running a language script in the speech recognizer 115 and comparing it to grammar rules that are stored in a database 125 outside the application framework 100. The language script is a Grammar Extensible Markup Language (GrXML). The grammar rules contain logic on rule organization and processing, and are organized within the GrXML. A configuration interface 120 that is also stored outside the application interface provides the means to change settings in the recognition space of the grammar rule such as recognition policy and vocabulary domain. The method of processing the audio speech transmission 110 comprises steps of comparing language in the speech transmissions to language in the grammar rules, finding a most likely match, producing a textual representation of the language and creating and transmitting consumable data to the trainer core 130 to be utilized by the training application. This method will be described below in more detail in reference to FIGS. 1 and 2.

Figure 2:
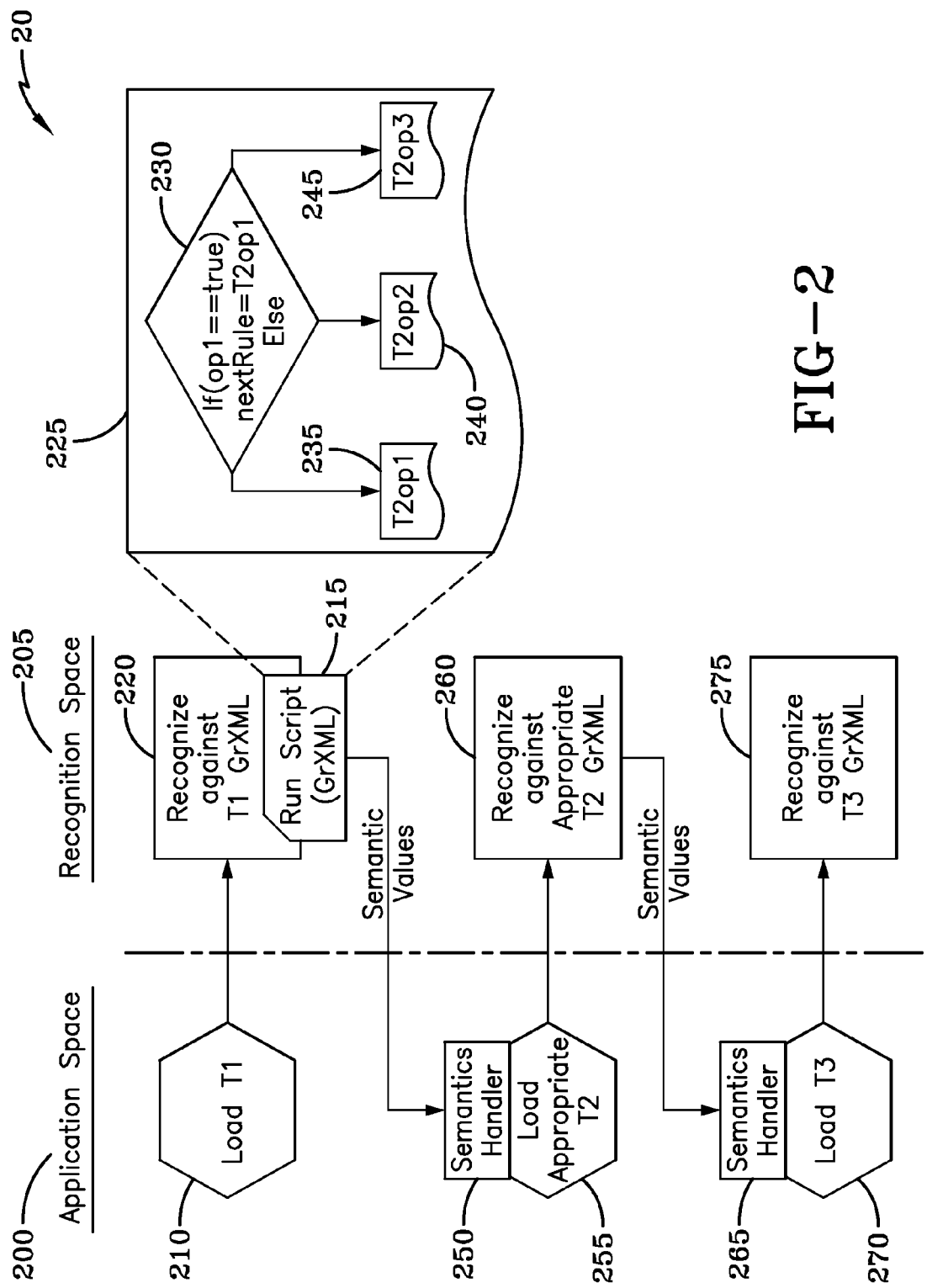
FIG. 2 is a flow chart of the speech recognition process.

FIG. 2 shows the steps of the speech recognition and processing method using the grammar rules. The grammar rule software 20 is divided into two parts: the application space 200 and the recognition space 205. The audio speech transmissions 110 are configured and loaded in the application space 100 and recognized and processed in the recognition space 115.

Prior to receiving any inputs, a first set of grammar rules is created. The grammar rules are logic functions that piece together transmitted utterances into coherent sentences based on the state of the training system and previously processed language. For example, in an inflight aviation training exercise, an airplane may be rapidly descending to land on a short runway and the previously processed speech was the pilot's communication to the flight tower of her approach speed. The generated grammar rules will have language that would be included in sentences that are most likely to be uttered by personnel in the tower, in response to the pilot's communication. In this instance, an approach speed adjustment for a safer landing, which is one of the more likely responses from tower personnel based on the state of matters (the airplane's rapid decent to the runway) in the training scenario and the previously processed language (the pilot's report of her approach speed). In the case of the very first audio transmission, the grammar rules will contain language that is based on a prior knowledge of the type of training that is the subject of the system and the first action likely to be taken as part of the training exercise. In other words, the most likely utterances that are used to initialize the training session based on the type of training and the situational starting point.

In step 210, the first audio transmission is loaded into the system. In step 215 a language script is run and used to compare the language in the audio transmission to the first set of grammar rules to determine whether there is a match in step 220. In a preferred embodiment the language script is Grammar Extensible Markup Language (GrXML). However, other types of language scripts can be used.

The grammar rule comparison process can take on several different forms using the speech recognizer 115. The speech recognizer 115 can be thought of as a state machine that will behave differently depending on the type of recognition policy that is set. One example of a recognition policy is a round robin. In this policy, the recognizer cycles through the list of grammar rules and returns semantic values for the first rule that has a recognition hit. Another policy is best confidence. With a best confidence policy the recognizer cycles through the whole list of rules and returns the semantic values from the grammar rule with the highest recognized confidence metric. Yet another policy involves simultaneous grammar. In this type of policy, all the chosen grammar rules are loaded simultaneously into the recognizer. Arbitration for which rule to be used for recognition is done internally be the recognizer 115. The system can also support other types of recognition policies.

A preferred embodiment, the round robin recognition policy of the comparison process 225, is shown in FIG. 2. The recognition policy is set in the recognizer 115, and the set of grammar rules is loaded. The recognizer 115 cycles through each one of the grammar rules one by one comparing the audio transmission to the rule to find a language match. This is shown in steps 235-245. This process continues until a match is found or, if no match is found in the first set of grammar rules, a second set of grammar rules is loaded, and the process is repeated. Once a match is found the semantic values of the matched language are loaded into the semantics handler of the recognizer in step 250. These semantic values, along with the state of the training simulation, are then used to determine the new set of grammar rules for the next audio transmission.

Retuning to the inflight aviation example to further describe this process, when personnel in the flight tower tells the pilot to reduce her speed to ready her approach and this speech is recognized, semantic values are assigned to the language. The semantic values provide indicators of the linguistic utterances that are most likely to happen next. These semantic values, along with the state of the simulation (the planned runway approach), are used to create a subsequent set of grammar rules to be used to recognize the next audio transmission. In step 255 the next audio transmission is loaded and the processes described above are repeated as shown in FIG. 2 in steps 260 through 275. FIG. 2 can also be used to represent the best confidence embodiment of the recognition policy by changing step 230 to represent the best confidence decision. Step 230 would read Select (highest confidence); nextRule=T2op1.

The above description is that of current embodiments of the invention. Various alterations and changes can be made without departing from the spirit and broader aspects of the invention as defined in the appended claims.

What is claimed is:

1. A method for electronically recognizing and processing speech comprising:
   creating a first set of grammar rules;
   loading the first set of grammar rules into a speech recognizer;
   receiving a first transmitted audio stream containing a first utterance of speech to be recognized;
   running a language script in the speech recognizer;
   comparing language in the first transmitted audio stream to language in the first set of grammar rules to determine whether the language in the first transmitted audio stream matches language in the first set of grammar rules;
   producing a textual representation of the language of the first transmitted audio stream, using language of one of the grammar rules of the first set of grammar rules, to create consumable data when a match between the language of the first transmitted audio stream and the language of one of the first set of grammar rules is found;
   transmitting the consumable data to a processor;
   determining which grammar rule has language that most likely matches the language of the first transmitted audio stream, when multiple possible matches are found;
   producing a textual representation of the language of the first transmitted audio stream using language of a best matched grammar rule of the first set of grammar rules to create consumable data;
   transmitting the consumable data to the processor;
   creating a subsequent set of grammar rules when no match is found between the language of the first transmitted audio stream and the language of the first set of grammar rules;
   repeating the loading, comparing and determining steps with language of the subsequent set of grammar rules and language of the first transmitted audio stream until a match is found;
   producing a textual representation of the language of the first transmitted audio stream using language of a best matched grammar rule of the subsequent set of grammar rules, to create consumable data;
   transmitting the consumable data to the processor; and
   creating a separate set of grammar rules to recognize and process a second transmitted audio stream containing a second utterance separate and distinct from the first utterance in the first audio stream where the separate set of grammar rules is based on the consumable data transmitted from the first transmitted audio stream and repeating the recognizing and processing speech steps, whereby, results of a current recognition event impacts future recognition events by producing consumable data from the loaded set of grammar rules to determine the next appropriate set of rules.

2. The method of claim 1, wherein choosing the first grammar rule is based a prior knowledge of language most likely to be used in the first transmitted audio stream.

3. The method of claim 1, wherein the grammar rules define words that are expected to be contained in vocal utterances.

4. The method of claim 1, wherein the transmitted audio streams are spoken language.

5. The method of claim 1, wherein creating a subsequent set of grammar rules is based on audio stream language most likely to be used next based on a context of previously transmitted audio streams.

6. The method of claim 1, wherein the grammar rules are written using a grammar specification language such as grXML or the like.

7. The method of claim 1, wherein the first and subsequent sets of grammar rules are subsets of an entire grammar.

8. The method of claim 1, wherein size and number the first and subsequent sets of grammar rules size and number are limited by context of language in the transmitted audio streams.

9. A system for context driven speech recognition comprising:
   a processor;
   a user interface electronically connected to the processor;
   a voice input device electronically connected to the user interface;
   a speech recognizer electronically connected too the processor;
   a memory electronically connected the processor;
   an application framework stored in the memory;
   a logic function stored in the memory; and
   a configuration, interface stored the memory, wherein
      a first set of grammar rules, stored in the memory, is loaded into the speech recognizer;
      the user interface receives a first transmitted audio stream containing a first utterance of speech to be recognized;
      the speech recognizer runs a language script to compare language in the first transmitted audio stream to language in the first set of grammar rules to determine whether the language in the first transmitted audio stream matches language in the first set of grammar rules;
      the logic function produces a textual representation of the language of the first transmitted audio stream, using language of one of the grammar rules of the first set of grammar rules, to create consumable data when a match between the language of the first transmitted audio stream and the language of one of the first set of grammar rules is found, and transmits the consumable data to the processor;
      the processor determines which grammar rule of the first set of grammar rules has language that best matches the language of the first transmitted audio stream, when multiple matches are found; the application framework produces a textual representation of the language of the first transmitted audio stream using language of the best matched grammar rule of the first set of grammar rules to create consumable data and transmits the consumable data to the processor;
      the logic function creates a subsequent set of grammar rules when no match is found between the language of the first transmitted audio stream and the language of the first set of grammar rules to recognize and process a second transmitted audio stream containing a second utterance separate and distinct from the first utterance in the first audio stream where the separate set of grammar rules is based on the consumable data transmitted from the first transmitted audio stream and repeating the recognizing and processing speech steps, whereby, results of a current recognition event impacts future recognition events by producing consumable data from the loaded set of grammar rules to determine the next appropriate set of rules.

* * * * *